United States Patent
Pashley et al.

(10) Patent No.: US 7,007,485 B2
(45) Date of Patent: Mar. 7, 2006

(54) CONTROLLING THE FUEL SUPPLY TO A COMBUSTOR OF A GAS TURBINE ENGINE

(75) Inventors: Nicholas C Pashley, Bristol (GB); Leslie R Summerfield, Bristol (GB)

(73) Assignee: Rolls-Royce plc, London (GB)

( * ) Notice: Subject to any disclaimer, the term of this patent is extended or adjusted under 35 U.S.C. 154(b) by 70 days.

(21) Appl. No.: 10/742,936

(22) Filed: Dec. 23, 2003

(65) Prior Publication Data
US 2005/0072159 A1 Apr. 7, 2005

(30) Foreign Application Priority Data
Jan. 16, 2003 (GB) .................................. 0301001

(51) Int. Cl.
*F02C 9/28* (2006.01)

(52) U.S. Cl. ..................... 60/773; 60/39.91; 60/39.281

(58) Field of Classification Search ............. 60/39.091, 60/39.281, 773, 779
See application file for complete search history.

(56) References Cited

U.S. PATENT DOCUMENTS

| | | | | |
|---|---|---|---|---|
| 3,377,848 A | * | 4/1968 | Marvin | 60/39.281 |
| 5,265,414 A | * | 11/1993 | Mouton | 60/39.281 |
| 5,477,670 A | | 12/1995 | Ikeda et al. | |
| 5,596,871 A | | 1/1997 | Lenertz | |
| 5,694,760 A | * | 12/1997 | Baxter | 60/773 |
| 5,743,079 A | * | 4/1998 | Walsh et al. | 60/773 |

FOREIGN PATENT DOCUMENTS

| | | |
|---|---|---|
| EP | 0 616 118 A1 | 9/1994 |
| GB | 2 011 091 A | 7/1979 |

* cited by examiner

*Primary Examiner*—Louis J. Casaregola
(74) *Attorney, Agent, or Firm*—Oliff & Berridge, PLC

(57) ABSTRACT

The minimum fuel flow to a combustor of a gas turbine engine is controlled in response to the combustor inlet temperature $T_3$ in order to provide a FAR stability margin which responds to the combustor inlet temperature. This enables the FAR stability margin to be reduced when the risk of flame out is low, for example when the combustor entry temperature is high, while increasing the FAR stability ratio when the combustor entry temperature is low, ie when the engine is idling or when water is ingested.

9 Claims, 1 Drawing Sheet

CONTROLLING THE FUEL SUPPLY TO A COMBUSTOR OF A GAS TURBINE ENGINE

Figure 1:
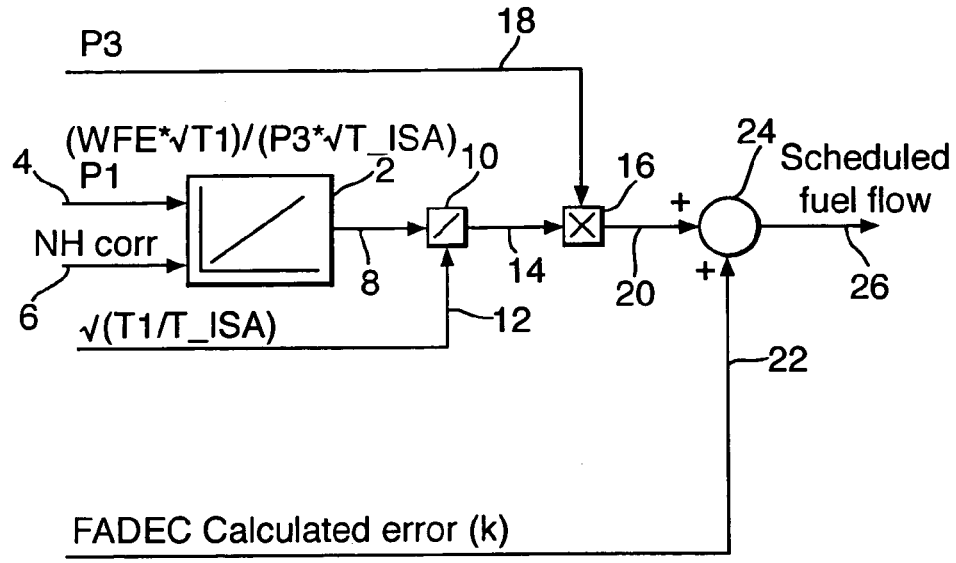

This invention relates to the control of a fuel supply to a combustor of a gas turbine engine.

Under some conditions, the flame in a gas turbine engine combustor may be extinguished unintentionally. This is known as flame out. Flame out can occur when an engine is decelerated rapidly from a high power setting to idle, or while an engine is idling. In the first case, deceleration is achieved by reducing the flow of fuel to the combustors of the engine and, if the fuel flow reduction is not carefully controlled, the fuel air ratio (FAR) may fall to a level at which the flame is extinguished. During idle, small modulations around the predetermined idle speed can result in a reduction of the FAR and consequent extinction of the flame.

In order to comply with emission requirements, the size of gas turbine engine combustors has tended to increase, and this has increased the likelihood of a reduction in local FAR within the combustor, so increasing the likelihood of flame out. Also, the risk of flame out increases as the temperature in the combustor decreases, since the flame can be extinguished by chilling. This contributes to the likelihood of flame out during idling, since an idling engine runs at a lower temperature than one operating at full power. In addition, water or ice ingestion removes heat from the engine, and, again, increases the likelihood of flame out.

In order to minimise the possibility of flame out a stability margin is set. The stability margin takes account of the FAR weak extinction threshold but also includes factors which take account of differences between engine builds, control system tolerances and other such possible errors. The stable control of an engine requires the supply of fuel to be sufficient to keep the FAR above the stability margin. However, as mentioned above, the likelihood of flame out varies depending on the operation of the engine, and while the stability margin can be relatively small when, for example, operating at high engine power and consequently at high temperature, it should be increased while the engine is idling or operating at low temperature.

It is known to base the fuel flow rate to a gas turbine engine combustor on, inter alia, the compressor inlet temperature ($T_1$). This is the engine inlet temperature, and is consequently the temperature of the ambient surroundings. While this provides adequate performance in most circumstances, it fails to take account of the combustor operating temperature, and also means that the fuel supply to the combustor cannot take account of the cooling effect of water or ice ingestion.

According to the present invention there is provided a method of controlling the fuel supply to a combustor of a gas turbine engine, the method comprising:

(a) deriving from a first set of operating parameters of the engine, a first derived value which represents the fuel requirement of the combustor multiplied by a factor, which factor includes the combustor inlet temperature;

(b) measuring the combustor inlet temperature and calculating therefrom the factor;

(c) dividing the first derived value by the factor to generate a second derived value; and (d) generating the fuel requirement from the second derived value.

The factor may be of the form $$k\sqrt{\frac{T_3}{T_{ISA}}}$$

where $T_3$ is the combustor inlet temperature, $T_{ISA}$ is the standard atmospheric temperature (288° K), and k is a coefficient dependent on characteristics of the combustor. Different combustors, even if nominally of the same design, may have different combustion characteristics and the coefficient k provides an opportunity for adjustment to compensate for these differences.

The first derived value may represent the fuel requirement of the combustor not only multiplied by the factor including the combustor inlet temperature, but also divided by the pressure at the inlet of the combustor. In this case, the fuel requirement may be generated in step (d) by multiplying the second derived value by the pressure $P_3$ at the combustor inlet. In addition, the value obtained following such division may be adjusted in response to the value of a signal calculated in the Full Authority Digital Engine Controller (FADEC).

The first set of operating parameters from which the first derived value is derived may be the pressure at the engine inlet ($P_1$) and the spool speed of the HP compressor (NH). This speed may be corrected to compensate for the engine inlet temperature by dividing the actual HP spool speed by $$\sqrt{\theta}$$

where $$\frac{T_1}{T_{ISA}}$$

According to another aspect of the present invention, there is provided a control system for controlling the fuel supply to a combustor of a gas turbine engine, the control system comprising:

(a) a processor unit adapted to derive, from a first set of operating parameters of the engine, a first derived value which represents the fuel requirement of the combustor multiplied by a factor, which factor includes the combustor inlet temperature;

(b) a calculating device for receiving a signal representing the combustor inlet temperature, and for calculating the factor from the combustor inlet temperature;

(c) a divider for dividing the first derived value by the factor to generate a second derived value; and (d) a calculating arrangement for generating the fuel requirement from the second derived value.

A multiplier may be provided for multiplying the factor by an adjustment coefficient, the adjusted factor then being supplied to the divider for the generation of the second derived value.

A multiplier may be provided for receiving the second derived value from the divider, and for multiplying the second derived value by the value of the combustor inlet pressure. Furthermore, an adder may be provided for adding to the output of the multiplier a calculating error value, and for outputting a scheduled fuel flow signal.

Figure 2:
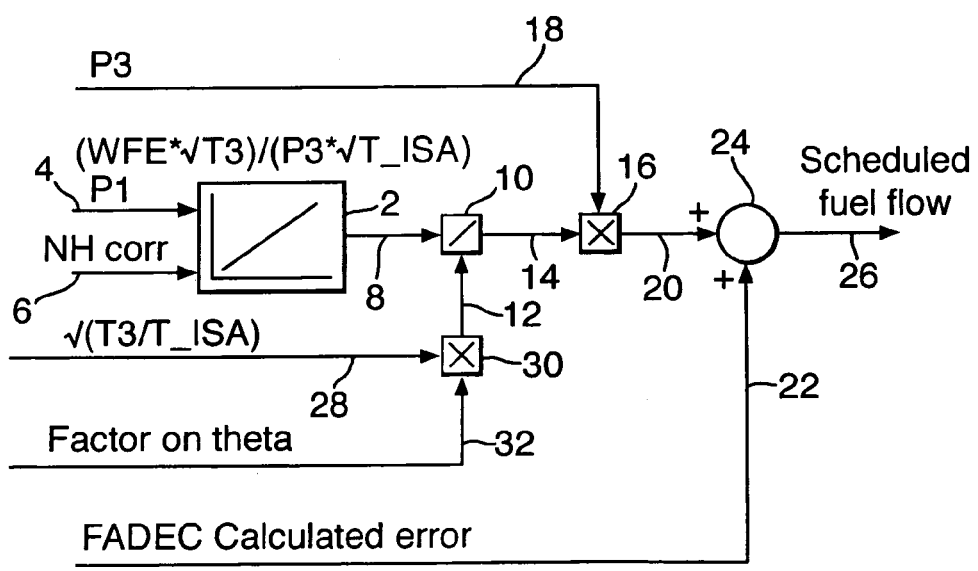

For a better understanding of the present invention, and to show how it may be carried into effect, reference will now be made, by way of example, to the accompanying drawings, in which:

FIG. 1 is a diagram representing a known control system for controlling the fuel supply to a combustor of a gas turbine engine; and FIG. 2 corresponds to FIG. 1, but represents control apparatus in accordance with the present invention.

The apparatus shown in FIG. 1 comprises a processor device 2 serving as a look-up table. The device 2 receives a first input 4 representing the engine input pressure $P_1$ and a second input 6 representing a corrected HP spool speed $NH_{CORR}$, where:

$$NH_{corr} = \frac{NH}{\sqrt{\theta}}$$

and $$\theta = \frac{T_1}{T_{ISA}}$$

The inputs 4 and 6 represent in the device 2 a particular address containing a unique value representing the function $$\frac{WFE \cdot \sqrt{T_1}}{P_3 \cdot \sqrt{T_{ISA}}}$$

The signal representing this value is output on line 8 to a divider 10.

The divider 10 has a second input 12 through which the divider 10 receives a signal representing $$\sqrt{\theta}$$

where $$\theta = \frac{T_1}{T_{ISA}}$$

wherein $T_1$ is the engine inlet temperature and $T_{ISA}$ is the standard atmospheric temperature of 280° K. It will be appreciated that, by dividing the input on line 8 by the input on line 12, the output from the divider on line 14 is $$\frac{WFE}{P_3}$$

A signal representing this value is input on line 14 to a multiplier 16, which also receives a signal on line 18 representing the combustor inlet pressure $P_3$. Multiplying the inputs on lines 14 and 18 provides an output on line 20 equal to WFE, the calculated engine fuel volume flow rate. In some circumstances, this calculated value needs to be corrected in response to a FADEC signal carried on an input line 22 of an adder 24, to which the signal on line 20 is also input. The output of the adder 24 consequently represents the required scheduled fuel flow.

The apparatus of the present invention is represented in FIG. 2. In this apparatus, components corresponding to those of FIG. 1 are represented by the same reference numbers.

In the apparatus of FIG. 2, the processing device 2 outputs on line 8 a signal representing the value of a function:

$$\frac{WFE \cdot \sqrt{T_3}}{P_3 \cdot \sqrt{T_{ISA}}}$$

It will be appreciated that, in this function $T_3$ has been substituted for $T_1$ in FIG. 1. Consequently, the output on line 8 represents the fuel requirement WFE multiplied by a factor $$\sqrt{\frac{T_3}{T_{ISA}}}$$

which includes $T_3$ and divided by the combustor inlet pressure $P_3$. This value is input as the numerator of the divider 10.

A signal representing the value of $$\sqrt{\frac{T_3}{T_{ISA}}}$$

is input on line 28 to a multiplier 30, which also receives an input on line 32 representing "a factor on θ". This is a factor k which is an adjustment factor to compensate for deviations in characteristics of the combustor in question by reference to a norm. The output of the multiplier 30, ie the signal transmitted along line 12, is thus the value of $$k\sqrt{\frac{T_3}{T_{ISA}}}$$

Thus, the output on line 14 represents a second derived value which is operated upon by the multiplier 16 and the adder 24, as in the apparatus of FIG. 1, to produce a signal on line 26 representing the schedule fuel flow.

The use of the combustor inlet temperature $T_3$ instead of the engine inlet temperature $T_1$ allows a more accurate determination of combustor condition (proximity to flame out) and hence a more accurate calculation of an appropriate FAR stability margin. This enables the engine in question to achieve an increased deceleration rate without compromising the stability margin during small modulation around idle, for example as the engine speed fluctuates around the desired idling speed in the final stages of deceleration.

Whereas $T_1$ remains unaffected by the operational condition of the engine, this is not the case with $T_3$. At high engine power settings, $T_3$ is high, and the FAR stability margin can then be set sufficiently low to achieve a required deceleration rate to the steady state idling condition. However, if $T_3$ falls, for example as a result of water of ice ingestion, the FAR stability margin is increased towards the steady state idle FAR stability margin value.

If subsequent small modulations occur around the idle speed, for example as a result of the engine speed overshooting the required idle speed during deceleration, then the limiting FAR is increased to satisfy the requirement for increased stability margin. Subsequent acceleration of the engine to a higher power setting causes $T_3$ to increase, and the limiting FAR is reduced as the stability margin requirement is lowered enabling the next deceleration to take place relatively rapidly.

As mentioned above, apparatus in accordance with the present invention enables the engine to respond to water or ice ingestion. When water is ingested the high pressure ($P_3$) at the inlet to the combustor may be sufficiently high to ensure saturation of the air, with the result that liquid water is allowed to enter the combustor, despite the high combustor inlet temperature $T_3$. This liquid water then evaporates within the combustor, and extracts energy from the combustion process, so reducing the temperature in the primary zone of combustion. Under some circumstances, this loss of energy can cause flame out. If the FAR stability margin is determined according to the prior art (FIG. 1), it is not adjusted in response to the cooling effect created by water ingestion. However, by incorporating the combustor inlet temperature $T_3$ in the algorithm for determining the schedule fuel flow, the reduction in temperature caused by water ingestion has the effect of raising the FAR stability margin, so reducing the risk of flame out.

At idle, the engine is controlled to a predetermined speed. If water is ingested, the combustor temperature is reduced, so reducing the output of the turbine stage. Consequently, more fuel is required to generate sufficient power to maintain the idle speed. If the FAR is close to the stability margin, the engine is at risk of flame out.

However, by employing the apparatus shown in FIG. 2, the stability margin, and hence minimum engine speed, is raised as a result of the vaporisation of the water, so alleviating this risk.

What is claimed is:

1. A method of controlling the fuel supply to a combustor of a gas turbine engine, the method comprising:
   (a) deriving from a first set of operating parameters of the engine, a first derived value which represents the fuel requirement of the combustor multiplied by a factor, which factor includes the combustor inlet temperature;
   (b) measuring the combustor inlet temperature and calculating therefrom the factor;
   (c) dividing the first derived value by the factor to generate a second derived value; and
   (d) generating the fuel requirement from the second derived value.

2. A method as claimed in claim 1, in which the factor by which the first derived value is divided is of the form of $$k\sqrt{\frac{T_3}{T_{ISA}}}$$

wherein k is a coefficient dependent on the characteristics of the combustor, $T_3$ is the combustor inlet temperature, and $T_{ISA}$ is the standard atmospheric temperature.

3. A method as claimed in claim 1, wherein the first derived value is of the form of $$\frac{WFE \cdot \sqrt{T_3}}{P_3 \cdot \sqrt{T_{ISA}}}$$

wherein WFE is a calculated fuel flow requirement, $T_3$ is the combustor inlet temperature, $P_3$ is the combustor inlet pressure, and $T_{ISA}$ is the standard atmosphere temperature.

4. A method as claimed in claim 3, in which the fuel requirement is generated from the second derived value by multiplying the second derived value by $P_3$.

5. A method as claimed in claim 1, in which the generation of the fuel requirement from the second derived value includes an error compensation adjustment.

6. Apparatus for controlling the fuel supply to a combustor of a gas turbine engine, the control system comprising:
   (a) a processor unit adapted to derive, from a first set of operating parameters of the engine, a first derived value which represents the fuel requirement of the combustor multiplied by a factor, which factor includes the combustor inlet temperature;
   (b) a calculating device for receiving a signal representing the combustor inlet temperature, and for calculating the factor from the combustor inlet temperature;
   (c) a divider for dividing the first derived value by the factor to generate a second derived value; and
   (d) a calculating arrangement for generating the fuel requirement from the second derived value.

7. Apparatus as claimed in claim 6, in which the processor unit further comprises a look-up table.

8. Apparatus as claimed in claim 6, in which a multiplier is provided which provides an output signal to the divider, the multiplier receiving a first input representing $$\sqrt{\frac{T_3}{T_{ISA}}}$$

and a second input representing a coefficient k which is dependent on the characteristics of the combustor.

9. A gas turbine engine including apparatus as claimed in claim 6.

* * * * *